United States Patent [19]
Yamashita et al.

[11] Patent Number: 5,572,094
[45] Date of Patent: Nov. 5, 1996

[54] LIGHTING CIRCUIT FOR DISCHARGE LAMP

[75] Inventors: Masayasu Yamashita; Atsushi Toda; Goichi Oda, all of Shimizu, Japan

[73] Assignee: Koito Manufacturing Co., Ltd., Tokyo, Japan

[21] Appl. No.: 522,087

[22] Filed: Aug. 31, 1995

[30] Foreign Application Priority Data

Sep. 2, 1994 [JP] Japan .................................. 6-232538

[51] Int. Cl.$^6$ .................................................. G05F 1/00
[52] U.S. Cl. ...................... 315/308; 315/307; 315/291; 315/77; 315/82; 315/DIG. 7
[58] Field of Search .................................. 315/307, 308, 315/291, 247, 224, 200 R, 209 R, 128, 82, 83, 77, DIG. 5, DIG. 7

[56] References Cited

U.S. PATENT DOCUMENTS

| | | | |
|---|---|---|---|
| 4,240,009 | 12/1980 | Paul | 315/224 |
| 4,724,360 | 2/1988 | Luursema | 315/244 |
| 5,068,570 | 11/1991 | Oda et al. | 315/128 |
| 5,103,143 | 4/1992 | Daub | 315/308 |
| 5,140,229 | 8/1992 | Yagi et al. | 315/307 |
| 5,142,203 | 8/1992 | Oda et al. | 315/308 |
| 5,151,631 | 9/1992 | Oda et al. | 315/127 |
| 5,151,634 | 9/1992 | Nepote et al. | 315/307 |
| 5,198,728 | 3/1993 | Bernitz et al. | 315/307 |
| 5,212,428 | 5/1993 | Sasaki et al. | 315/308 |
| 5,278,452 | 1/1994 | Matsumoto et al. | 307/10.8 |
| 5,295,036 | 3/1994 | Yagi et al. | 361/79 |
| 5,365,152 | 11/1994 | Ozawa et al. | 315/291 |
| 5,449,973 | 9/1995 | Yamashita et al. | 315/82 |
| 5,465,029 | 11/1995 | Hanazaki | 315/308 |
| 5,491,387 | 2/1996 | Saito | 315/307 |

FOREIGN PATENT DOCUMENTS

| | | |
|---|---|---|
| 2103636 | 2/1994 | Canada . |
| 0536535 | 4/1993 | European Pat. Off. . |
| 4015398 | 11/1991 | Germany . |
| 4132299 | 4/1992 | Germany . |
| 4322384 | 1/1994 | Germany . |
| 4326881 | 3/1994 | Germany . |
| 4017415 | 4/1994 | Germany . |
| 2233796 | 1/1991 | United Kingdom . |

*Primary Examiner*—Robert Pascal
*Assistant Examiner*—Haissa Philogene
*Attorney, Agent, or Firm*—Sughrue, Mion, Zinn, Macpeak & Seas

[57] ABSTRACT

A lighting circuit converts the output voltage of a DC booster circuit to an AC voltage which is in turn supplied to a discharge lamp. The lighting circuit comprises a current/voltage detector for detecting signals equivalent to the current and voltage of the discharge lamp and a control circuit for controlling the output voltage of the DC booster circuit in accordance with detection signals from the current/voltage detector. The lighting circuit further comprises a first lighting acceleration controller for supplying power equal to or greater than the rated power to the discharge lamp when the lamp voltage is smaller than a predetermined value, and a second lighting acceleration controller for detecting the light-OFF time of the discharge lamp and changing the length of a period in which the current or power to be supplied to the discharge lamp by the second lighting acceleration controller is greater than the current or power to be supplied to the discharge lamp by the first lighting acceleration controller, in accordance with the light-OFF time of the discharge lamp.

12 Claims, 7 Drawing Sheets

LIGHTING CIRCUIT FOR DISCHARGE LAMP

BACKGROUND OF THE INVENTION

1. Field of the Invention

The present invention relates to a novel lighting circuit for a discharge lamp, which can shorten the time required for the flux of light to become stable when the discharge lamp is turned on again immediately after deactivation.

2. Description of the Related Art

Recently, compact metal halide lamps are receiving greater attention as a light source to take the place of an incandescent lamp. A known lighting circuit for a vehicular metal halide lamp is designed to use a DC power supply in such a way that a DC input voltage after being boosted is converted to an AC voltage of a rectangular waveform which is in turn applied to the metal halide lamp.

Because of slow starting of such a metal halide lamp from the cold state (hereinafter called "cold start"), one known control method temporarily supplies power greater than the rated power at the beginning of the lighting of the metal halide lamp to accelerate the lighting of the amp, thus improving the rising characteristic of the flux of light.

FIG. 13 exemplifies a lamp control curve, showing a lamp voltage (VL) on the horizontal scale and a lamp current (IL) on the vertical scale.

A control curve a can be separated into three areas with respect to VL. In an area Aa where VL is minimum, IL becomes maximum, whereas in an area Ac where VL is large, approximated constant power control with nearly the rated power is executed along the control line obtained by the linear approximation of a constant power curve. In the diagram, "Ps" is the operational point where the voltage and current indicate the rated values.

In an area Ab located between the areas Aa and Ac, control is so performed as to decrease IL as VL increases.

In a case where a metal halide lamp is reactivated immediately after deactivation (hereinafter called "hot start"), the above-described lighting control suffers a little longer time for the flux of light from the metal halide lamp to reach the steady level because the lighting acceleration control is not executed or is not effective in the area Ab.

As shown in FIG. 13, in the transition from point Ph on the constant power control line to point Ps at the hot start, the lighting acceleration control in the area Ab is not effected, and in the transition from point Pi on the control line in the area Ab to point Ps, the lighting acceleration control in the area Ab is inadequate. As indicated by a curve b in FIG. 14, therefore, a change in the flux of light L of the metal halide lamp from the point of rising to the point of reaching the steady level is gentle so that it takes time for the flux of light to reach the steady level. FIG. 14 presents an example of a change in the flux of light at the hot start, showing the time t on the horizontal scale and the flux of light L on the vertical scale (whose steady level is indicated by 100%).

SUMMARY OF THE INVENTION

Accordingly, it is an objective of the present invention to provide a lighting circuit for a discharge amp which can shorten the time for the flux of light of the discharge lamp to become stable when the lamp is reactivated immediately after deactivation.

To achieve this object, a lighting circuit of this invention comprises DC power supply circuit section for boosting and/or decreasing a DC voltage; a DC-AC converter for converting an output voltage of the DC power supply circuit section into an AC voltage; a lamp voltage detector for detecting a voltage applied to a discharge lamp or a signal equivalent to the voltage; a lamp current detector for detecting a current flowing in the discharge lamp or a signal equivalent to the current; a control circuit for controlling the output voltage of the DC power supply circuit section in accordance with signals from the lamp voltage detector and the lamp current detector and performing lighting control in accordance with a predetermined control curve defining a characteristic of the lamp voltage v.s. the lamp current; a first lighting acceleration controller, provided in the control circuit, for, when the lamp voltage is smaller than a rated value or a minimum value in a range including the rated value, supplying power equal to or greater than rated power to the discharge lamp during transition from a point where the lamp voltage of the discharge lamp has indicated a minimum value to a point where the lamp voltage rises to a level of steady power control; and a second lighting acceleration controller, provided in the control circuit, for detecting a light-OFF time of the discharge lamp and executing such control as to increase an amount of a lamp current or power to be supplied to the discharge lamp as the light-OFF time becomes longer, whereby at beginning of lighting when the discharge lamp is reactivated immediately after deactivation, a length of a period in which the current or power supplied to the discharge lamp by the second lighting acceleration controller is greater than a current or power supplied to the discharge lamp by the first lighting acceleration controller is changed in accordance with the light-OFF time of the discharge lamp.

According to this invention, at the hot start of a discharge lamp, the second lighting acceleration controller detects the light-OFF time of the discharge lamp (the time from the deactivation of the discharge lamp to the reactivation thereof) and executes such control as to increase the amount of the lamp current or power to be supplied to the discharge lamp as the light-OFF time becomes longer. When the first lighting acceleration control (control in the aforementioned area. Ab) is ineffective or inadequate, therefore, the second lighting acceleration controller can provide a supply current or power greater than the current or power supplied by the first lighting acceleration controller in a certain period at the initial stage of the lighting of the discharge lamp. It is thus possible to effect light control that matches with the state of the discharge-lamp at the time of reactivation by changing the length of that period in accordance with the light-OFF time of the discharge lamp.

3

Figure 3:
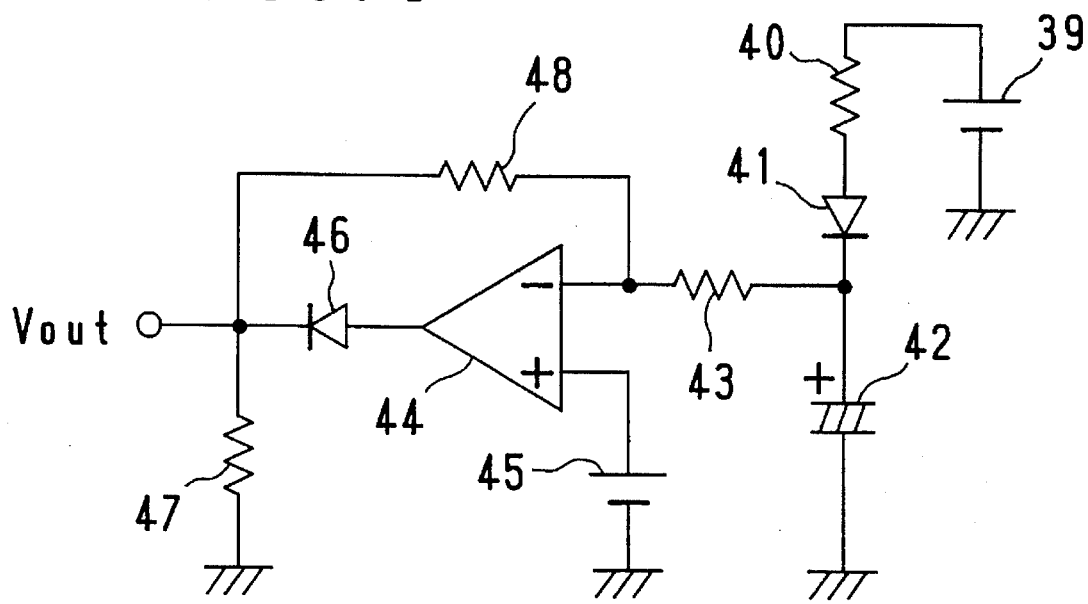
FIG. 3 is a diagram exemplifying the structure of a light-OFF time detector.
Figure 4:
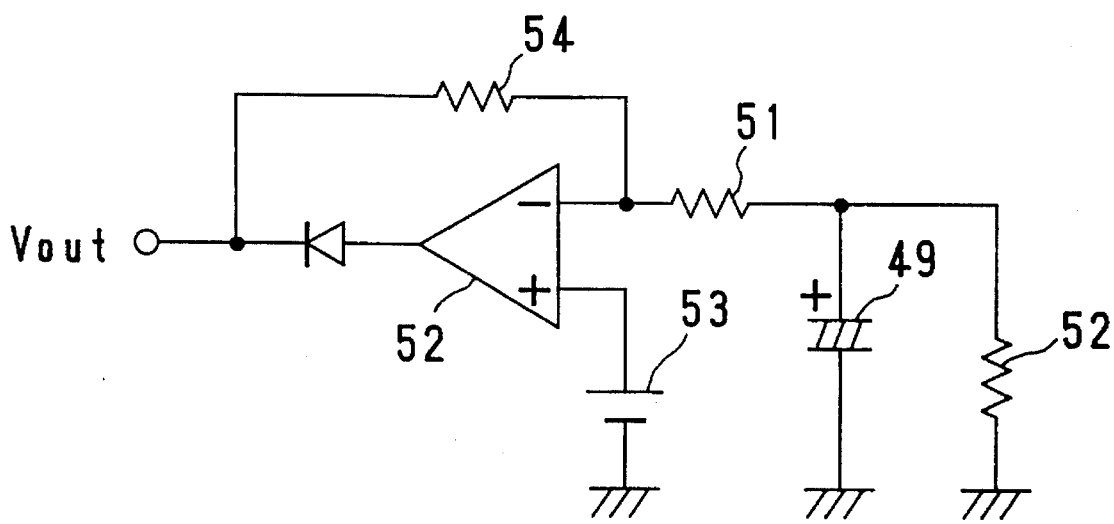
FIG. 4 is a diagram showing another structure for the light-OFF time detector.
Figure 5:
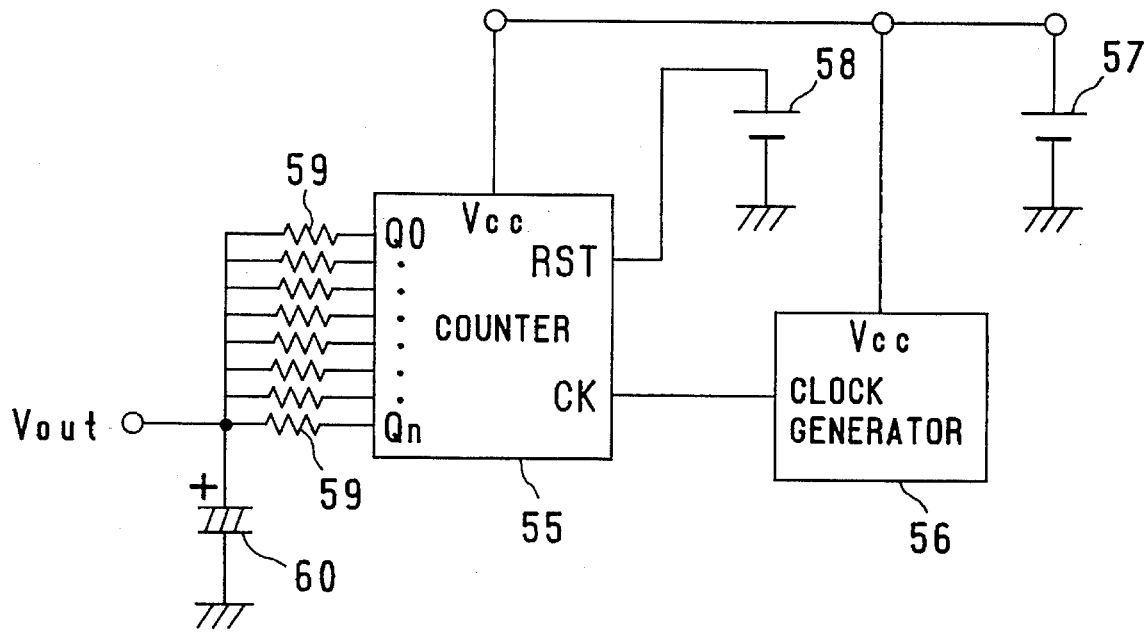
FIG. 5 is a diagram showing a further structure for the light-OFF time detector different from those shown in FIGS. 3 and 4.
Figure 6:
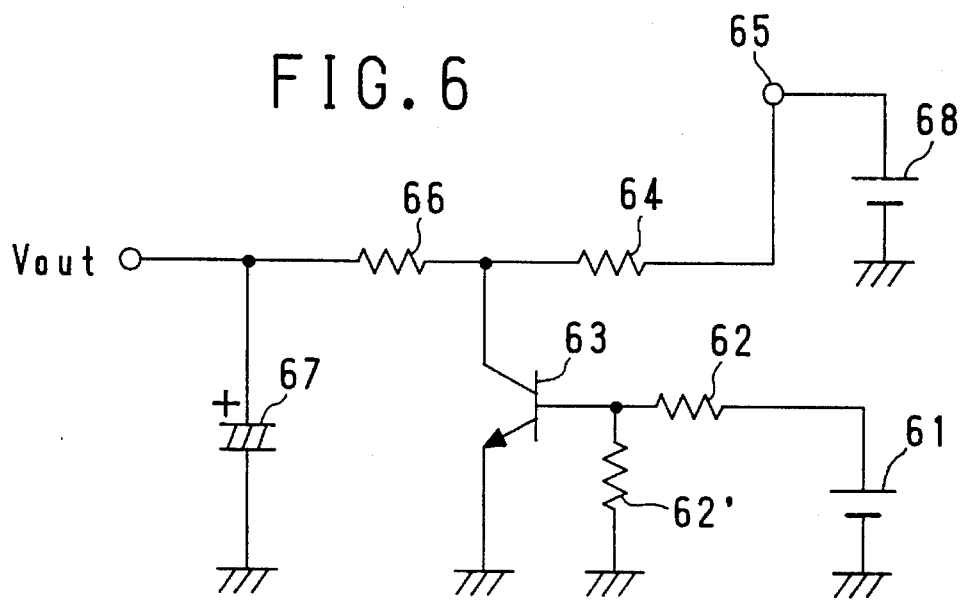

FIG. 6 is a diagram showing a still further structure for the light-OFF time detector different from those shown in FIGS. 3 to 5;

FIGS. 7 through 11 present graphs showing time-dependent changes in the output voltage V12 of a first lighting acceleration controller and the output voltage V13, of a second lighting acceleration controller.

Figure 7:
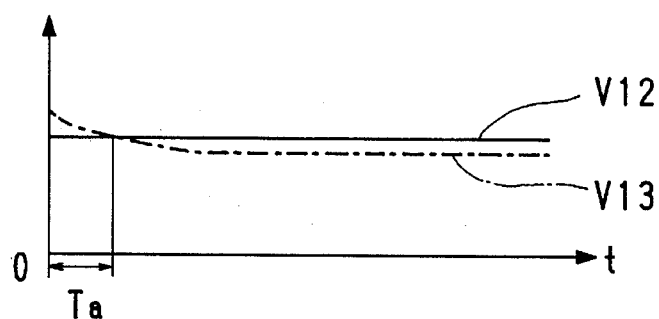
Figure 8:
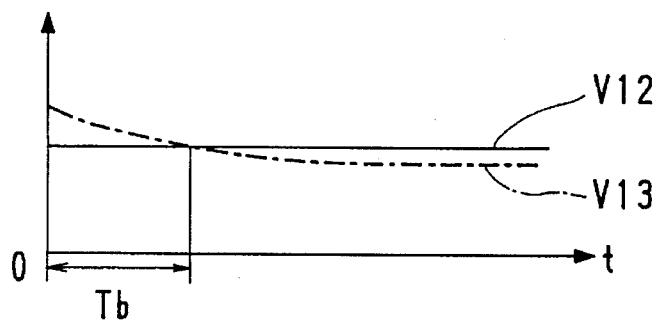
Figure 9:
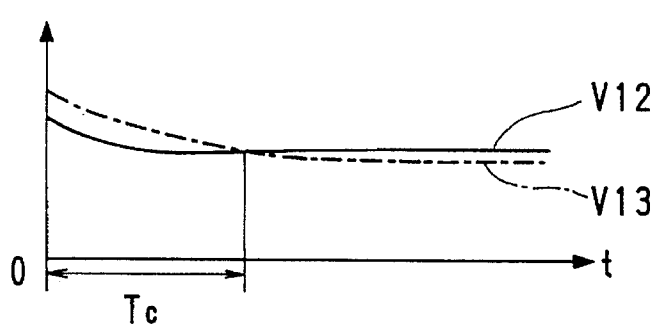
Figure 10:
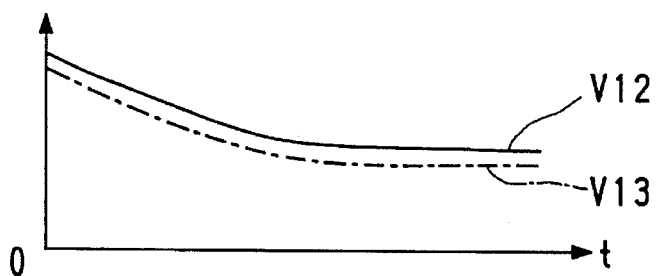
Figure 11:
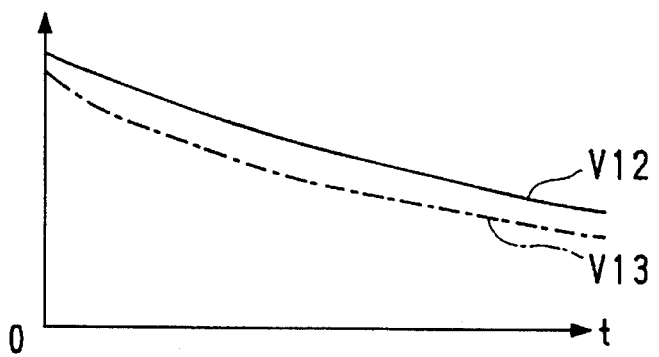
Figure 12:
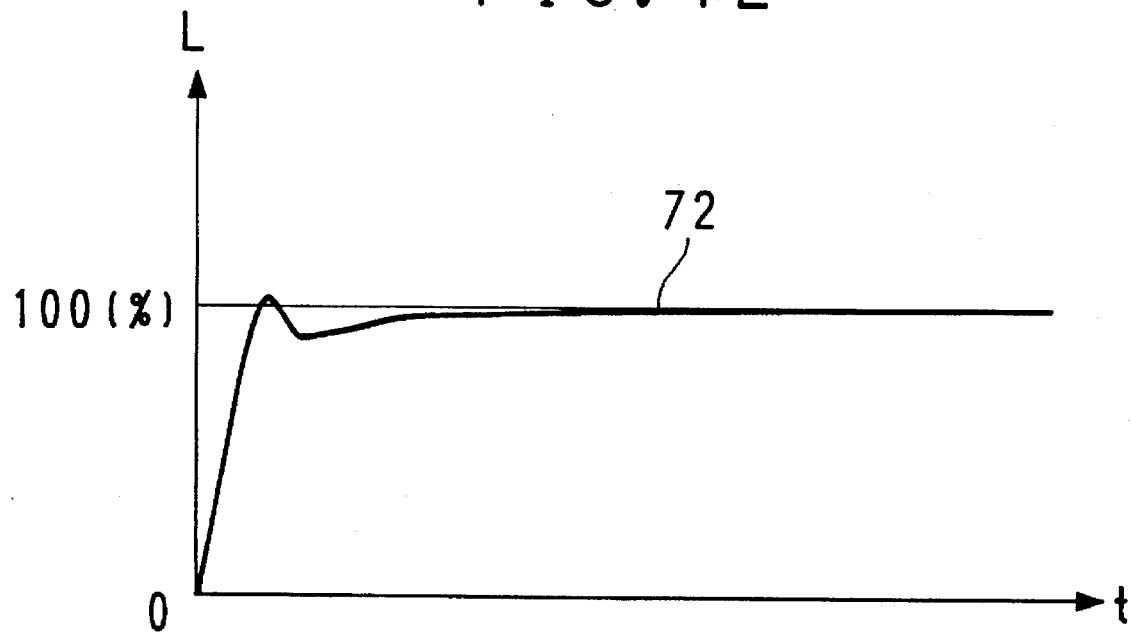
Figure 13:
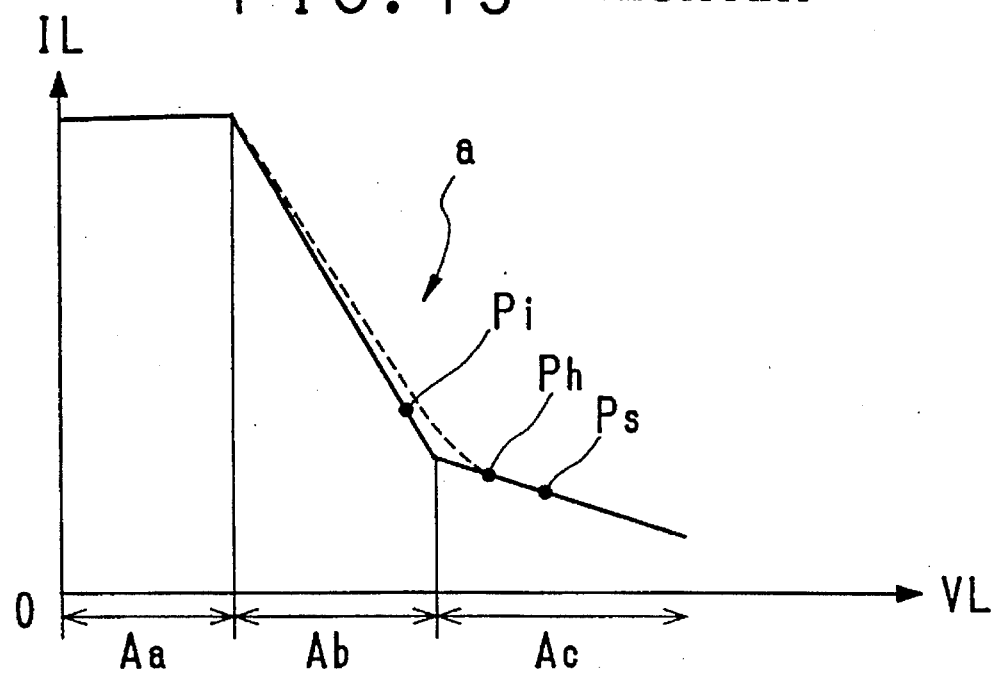
Figure 14:
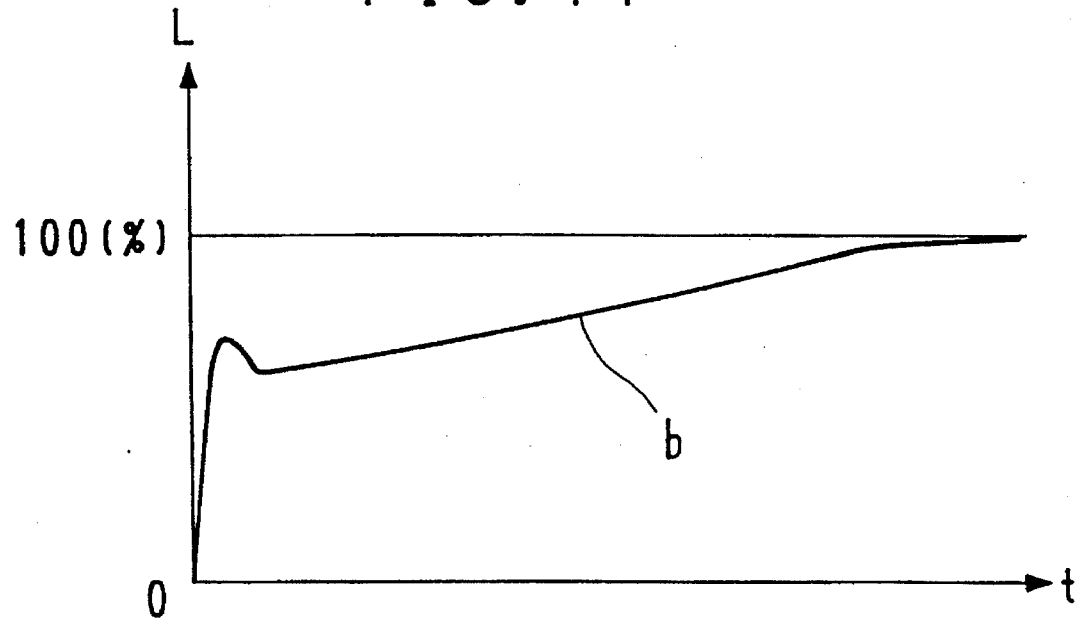

FIG. 7 is a graph for the shortest light-OFF time of a metal halide lamp;

FIG. 8 is a graph when the light-OFF time of the metal halide lamp is slightly longer than the one in FIG. 7;

FIG. 9 is a graph when the light-OFF time of the metal halide lamp is longer than the one in FIG. 8;

FIG. 10 is a graph when the light-OFF time of the metal halide lamp is longer than the one in FIG. 9;

FIG. 11 presents a graph showing time-dependent changes in the output voltages V 12 and V 13 at the cold start of a metal halide lamp;

FIG. 12 presents a graph schematically showing one example of a time-dependent change in the flux of light of a metal halide lamp at the hot start under the control of the lighting circuit of this invention;

FIG. 13 is a graph exemplifying the control curve that defines the characteristic of the lamp voltage v.s. the lamp current; and FIG. 14 presents a graph schematically showing a time-dependent change in lamp voltage at the hot start under the conventional lighting control.

DETAILED DESCRIPTION OF THE PREFERRED EMBODIMENT

A lighting circuit for a discharge lamp according to one embodiment of the present invention will now be described in detail with reference to the accompanying drawings.

Figure 1:
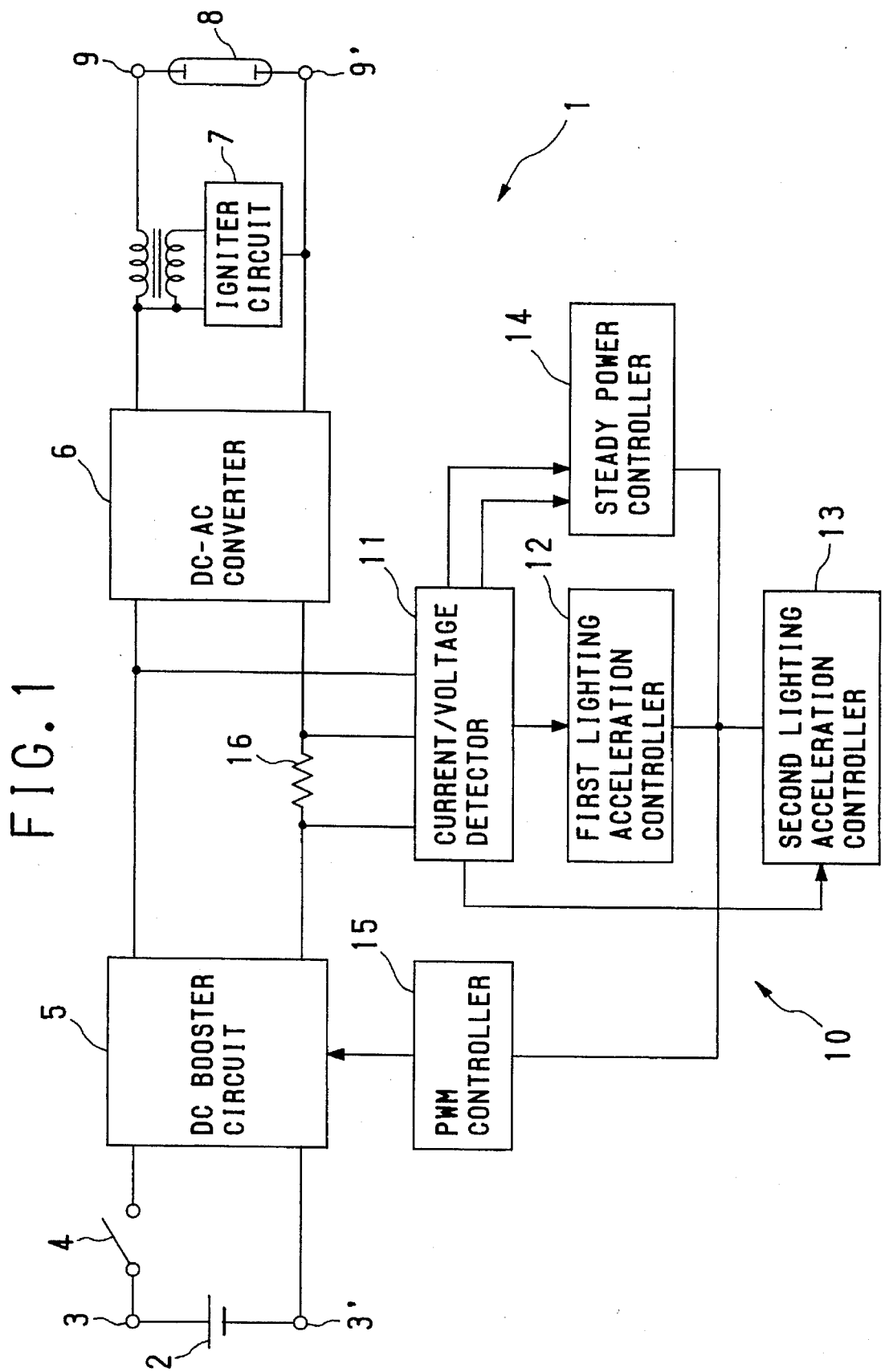
FIG. 1 is a circuit block diagram showing the structure of a lighting circuit for a discharge lamp according to this invention.

FIG. 1 presents a circuit block diagram showing the overall structure of a lighting circuit 1. The lighting circuit 1 includes a battery 2, connected between DC voltage input terminals 3 and 3', and a lighting switch 4, provided on the line that connects the positive input terminal of a DC booster circuit 5 to the DC voltage input terminal 3 (the positive terminal of the battery 2). The DC booster circuit 5 is not limited to the one which performs only boosting control, but may be designed to be able to execute both boosting control and voltage-dropping control.

The lighting circuit 1 further includes a DC-AC converter 6, an igniter circuit 7, and a control circuit 10. The DC-AC converter converts the DC output voltage of the DC booster circuit 5 to a voltage having a rectangular waveform. The igniter circuit 7 generates a trigger pulse when the metal halide lamp 8 is activated and superimposes this pulse on the AC output of the DC-AC converter 6. The output of the igniter circuit 7 is applied to the metal halide lamp 8 connected to AC output terminals 9 and 9'.

The control circuit 10, which controls the output voltage of the DC booster circuit 5, has a current/voltage detector 11, a first lighting acceleration controller 12, a second lighting acceleration controller 13, a steady power controller 14, a PWM (Pulse Width Modulation) controller 15.

The current/voltage detector 1 serves to detect signals equivalent to the lamp current and lamp voltage. The output voltage of the DC booster circuit 5 is input to this current/voltage detector 11. Also input to the current/voltage detector 11 is a current detection signal, which corresponds to the output current of the DC booster circuit, in a voltage form convened by a current detecting resistor 16 provided on the ground line that connects the DC booster circuit 5 to the DC-AC converter 6. Although the lamp voltage and lamp current may be detected directly, their equivalent signals are detected in this embodiment.

The first lighting acceleration controller 12 serves to execute light control at the cold start during transition from a point where the lamp voltage has become minimum to a point where the lamp voltage rises to the rated value for steady power control (see the area Ab in FIG. 13). The voltage detection signal from the current/voltage detector 11 is input to,the first lighting acceleration controller 12.

The second lighting acceleration controller 13 serves to supply power equal to or greater than the rated power to the metal halide lamp 8 at the hot start.

The steady power controller 14 performs control in the steady power area (corresponding to the area Ac in FIG. 13). This controller 14 receives the current and voltage detection signals from the current/voltage detector 11.

The outputs of the first lighting acceleration controller 12, the second lighting acceleration controller 13 and the steady power controller 14 are added together, and the resultant signal is then sent to the PWM controller 15. A control signal produced by the PWM controller 15 is fed back to the DC booster circuit 5.

Figure 2:
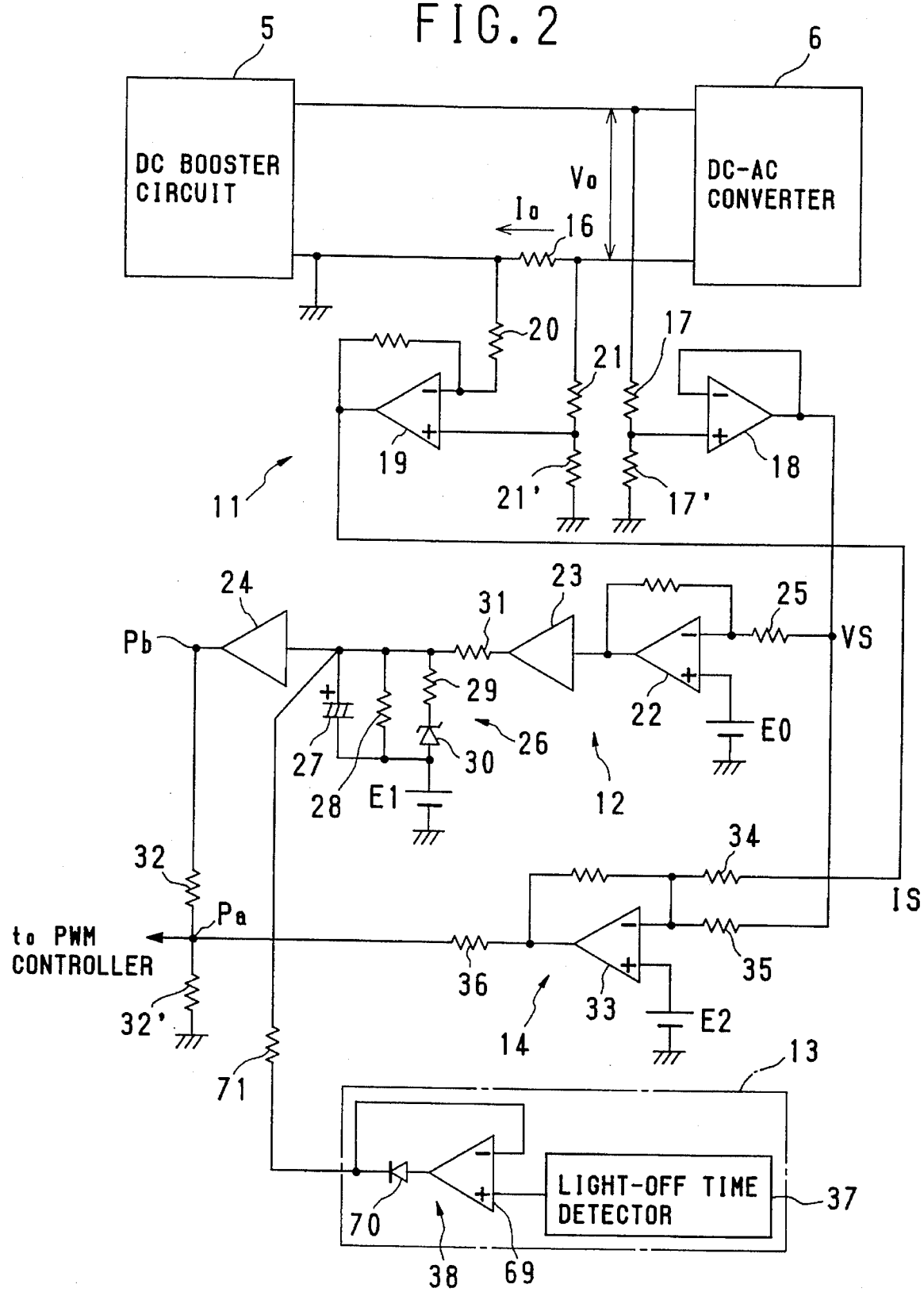
FIG. 2 is a circuit diagram showing the essential portions of the lighting circuit for a discharge lamp according to this invention.

FIG. 2 schematically shows the structure of the current/voltage detector 11, the first lighting acceleration controller 12, the second lighting acceleration controller 13 and the steady power controller 14.

The current/voltage detector 11 comprises two operation amplifiers 18 and 19. The output voltage of the DC booster circuit 5 is divided by voltage-dividing resistors 17 and 17', and the resultant voltage is supplied to the operation amplifier 18 which is structured as a voltage buffer. The terminal voltage of the current detecting resistor 16 is supplied to the operation amplifier 19 which is structured as a differential amplifier. More specifically, one end of the current detecting resistor 16 is connected to the inverting input terminal of the operation amplifier 19 via a resistor 20, the other terminal of the resistor 16 is grounded via resistors 21 and 21', and the non-inverting input terminal of the operation amplifier 19 is connected between the resistors 21 and 21'.

The first lighting acceleration controller 12 has an operation amplifier 22 and buffers 23 and 24. The operation amplifier 22 structured as a differential inverting amplifier has an inverting input terminal connected via a resistor 25 to the output terminal of the operation amplifier 18 and a non-inverting input terminal supplied with a reference voltage from a constant voltage supply E0. The output terminal of the operation amplifier 22 is connected to the input terminal of the buffer 23. A time constant circuit 26 is provided at the output stage of the buffer 23. This time constant circuit 26 has a capacitor 27, a resistor 28, and a series circuit of a resistor 29 and a Zener diode 30 connected in parallel.

The capacitor 27 and resistor 28 provided in parallel to each other have their one ends connected via a resistor 31 to the output terminal of the buffer 23. A reference voltage (indicated by "E1") is supplied to the other ends of the capacitor 27 and resistor 28.

The resistor 29 and Zener diode 30 are provided in parallel to the resistor 28. The Zener diode 30 has a cathode connected to one end of the resistor 29 and an anode supplied with the reference voltage E1.

The buffer 24 has an input terminal connected via a resistor 31 to the output terminal of the buffer 23 and an output terminal grounded via/resistors 32 and 32'. A voltage obtained from a node Pa between the resistors 32 and 32' is sent to the PWM controller 15.

The steady power controller 14 is structured as a differential inverting amplifier using an operation amplifier 33. The inverting input terminal of the operation amplifier 33 is connected to the output terminal of the operation amplifier 19 via a resistor 34 and to the output terminal of the operation amplifier 18 via a resistor 35. A reference voltage from a constant voltage supply E2 is supplied to the non-inverting input terminal of the operation amplifier 33.

The operation amplifier 33 is connected via a resistor 36 to the node Pa between the resistors 32 and 32'. The output of the first lighting acceleration controller 12 and the output of the steady power controller 14 are added at the node Pa and the result is supplied to the PWM controller 15.

Those circuits function in such a manner that the node Pa is always kept at a constant potential by the PWM-controlled feedback control. Under the steady power control with the output voltage (Vo) of the DC booster circuit 5 at the rated value, the control is performed in such a way that the value of an adding equation obtained by the linear coupling of the current detection signal (IS) and the voltage detection signal (VS) from the current/voltage detector 11 becomes constant. In other words, the output current (Io) of the DC booster :circuit 5 and the output voltage Vo are reciprocally controlled so that the value of a linear equation obtained by the linear approximation of the steady power curve becomes constant. For example, when the value of Vo is large, the value of Io becomes smaller, and when the value of Vo decreases, the value of Io increases. When the value of Vo is small, the first lighting acceleration controller 12 is activated to set the potential of its output terminal (potential at a node Pb greater than the potential at the node Pa. Therefore, the smaller the value of Vo becomes, the greater the value of Io becomes.

If the time constant circuit 26 in the first lighting acceleration controller 12 is neglected, the control line in the area Ab (see the solid control line in the area Ab in FIG. 13) becomes straight. The provision of the time constant circuit 26 however causes the control line in the area Ab to become a curve which attenuates exponentially with a rise in the lamp voltage to be smoothly linked to the steady power control line in the area Ac, as indicated by the broken-lined curve in FIG. 13.

The second lighting acceleration controller 13 comprises a light-OFF time detector 37 and a buffer 38 as shown in FIG. 2.

The light-OFF time detector 37 measures the time from the point when the metal halide lamp 8 is deactivated or the point when the lighting circuit 1 is deactivated by switching off the lighting switch 4. A circuit which utilizes the discharge of a capacitor or a battery may be used for this detector 37.

As shown in FIG. 3, for example, a constant voltage supply 39 is connected via a resistor 40 and a diode 41 to a capacitor 42 whose terminal voltage is input via a resistor 43 to the inverting input terminal of an operation amplifier 44 whose noninverting input terminal is supplied with a reference voltage from a constant voltage supply 45. An output voltage (Vout) should be obtained via a diode 46 provided at the output stage of the operation amplifier 44. The cathode of the diode 46 is grounded via a resistor 47 and is connected to the inverting input terminal of the operation amplifier 44 via a feedback resistor 48. The constant voltage supplies 39 and 49 are designed to generate reference voltages when the lighting circuit 1 is in operation. When the lighting circuit 1 is in operation, the capacitor 42 in the light-OFF time detector 37 is charged by the constant voltage supply 39, and when the lighting switch 4 is switched off, the capacitor 42 discharges so that its terminal voltage decreases with a predetermined time constant. When the lighting switch 4 is switched on next, therefore, Vout becomes larger as the light-OFF time Of the lamp gets longer.

The light-OFF time detector 37 may be designed as shown in FIG. 4 in which a resistor 50 is connected in parallel to a capacitor 49 whose terminal voltage is supplied via a resistor 51 to the inverting input terminal of an operation amplifier 52 whose non-inverting input terminal is supplied with a reference voltage which is generated by a constant voltage supply 53 when the lighting circuit 1 is in operation. An output voltage (Vout) should be obtained via a diode from the output terminal of the operation amplifier 52. The cathode of the diode 46 is grounded via a resistor 47 and is connected to the inverting input terminal of the operation amplifier 44 via a feedback resistor 48. The constant voltage supplies 39 and 49 are designed to generate reference voltages when the lighting circuit 1 is in operation. When the lighting circuit 1 is in operation, the capacitor 49 is charged via the feedback resistor 54 of the operation amplifier 52 and the resistor 51, and when the lighting switch 4 is switched off, the capacitor 49 discharges via the resistor 50. When the lighting switch 4 is switched on next, therefore, Vout becomes larger as the light-OFF time of the lamp becomes longer.

FIG. 5 exemplifies a circuit using a battery in which the supply voltage from a battery 57 is supplied to the power supply terminals (Vcc) of a counter 55 and a clock generator 56. A clock signal from the clock generator 56 is input to the clock input terminal (CK) of the counter 55, and a reset signal from a constant voltage supply 58 is supplied to the reset terminal (RST) of the counter 55 when the lighting circuit 1 is in operation. The individual output terminals of the counter 55 are connected via respective resistors 59 to one end of a capacitor 60 whose terminal voltage is taken out as Vout. When the lighting circuit 1 is in operation, the constant voltage supply 58 supplies the reset signal to the counter 55 so that the illustrated circuit does not function. When the lighting switch 4 is switched off, however, the resetting of the counter 55 by the constant voltage supply 58 is stopped, allowing the counter 55 to start counting. When the lighting switch 4 is switched on next, Vout is obtained from the count output corresponding to the light-OFF time of the metal halide lamp 8.

In a circuit shown in FIG. 6, a reference voltage from a constant voltage supply 61 is divided by resistors 62 and 62' and the resultant voltage is supplied to the base of an emitter-grounded NPN transistor 63. The collector of the transistor 63 is connected to a power supply terminal 65 via a resistor 64 and to one end of a capacitor 67 via a resistor 66. The supply voltage from a battery 68 is supplied to the power supply terminal 65, and the terminal voltage of the capacitor 67 is taken out as Vout. When the lighting circuit 1 is in operation, the transistor 63 is turned on by the voltage from the constant voltage supply 61 so that the capacitor 67 is not charged. When the lighting switch 4 is switched off, however, the transistor 63 is turned off, allowing the capacitor 67 to be charged. When the lighting switch 4 is switched on next, therefore, Vout corresponding to the length of the light-OFF time of the metal halide lamp 8 is obtained.

The buffer 38 of the second lighting acceleration controller 13 comprises an operation amplifier 69 and a diode 70 as shown in FIG. 2. The output of the above-described light- OFF time detector 37 is input to the non-inverting input terminal of the operation amplifier 69. The diode 70, provided at the output stage of the operation amplifier 69, has an anode connected to the output terminal of the operation amplifier 69. The cathode of the diode 70 is connected to the inverting input terminal of the operation amplifier 69 and to the input terminal of the buffer 24 of the first lighting acceleration controller 12 via a resistor 71.

FIGS. 7 through 11 show the results of the comparison between the time-dependent changes in the output voltage (V12) of the first lighting acceleration controller 12 and the time-dependent changes in the output voltage (V13) of the second lighting acceleration controller 13 under various conditions with different light-OFF times. The light-OFF times in FIGS. 7, 8, 9 and 10 are t1 seconds, t2 seconds, t3 seconds and t4 seconds (t1<t2<t3<t4), respectively. FIG. 11 shows a voltage change at the cold start. In those diagrams, the origin of the time t on the horizontal scale is the point of the reactivation of the lamp, and curves indicated by the solid lines represent the time-dependent changes in V12 while curves indicated by the one-dot chain lines represent the time-dependent changes in V13.

In FIG. 7, because of the short light-OFF time, the first lighting acceleration controller 12 does not work and its output voltage V12 becomes approximately constant regardless of the passage of the time. In a certain period Ta immediately after the reactivation of the lamp, V13≧V12 and the second lighting acceleration controller 13 becomes superior to the first lighting acceleration controller 12 with respect to the power control, accelerating the lighting of the metal halide amp 8. After the period Ta. V12<V13 and the second lighting acceleration controller 13 becomes inferior to the first lighting acceleration controller 12.

In FIG. 8, a period Tb is longer than the period Ta in FIG. 7 so that the acceleration of the lighting of the metal halide lamp 8 by the second lighting acceleration controller 13 is enhanced.

In FIG. 9, the effect of the working of the first lighting acceleration controller 12 appears and the output voltage V12 indicates the maximum value at t=0 and gradually approaches to the steady level thereafter. Likewise, the output voltage V13 becomes maximum at t=0 and decreases with the time thereafter. However, V13 is greater than V12 in a period Tc (>Tb) and becomes smaller than V12 after that period.

In FIGS. 10 and 11, V12 is always smaller than V13 so that the first lighting acceleration controller 12 is superior to the second lighting acceleration controller 13 in controlling the power, screening the output of the second lighting acceleration controller 13.

FIG. 12 schematically illustrates one example of the time-dependent change in the flux of light L of the metal halide lamp 8 at the hot start under the control of the lighting circuit 1, showing the time t on the horizontal scale and the flux of light L on the vertical scale (whose steady level is indicated by 100%).

It is apparent from a curve 72 that the flux of light L sharply rises, and quickly reaches the steady level for the stable lighting after a slight overshoot. This can contribute to improving the safety in driving a vehicle.

As apparent from the above, according to this invention, at the hot start of a discharge lamp, the second lighting acceleration controller detects the light-OFF time of the discharge lamp and executes such control as to increase the amount of the lamp current or power to be supplied to the discharge lamp as the light-OFF time becomes longer. When the first lighting acceleration control does not work or exhibits inadequate control due to the short light-OFF time of the discharge lamp, therefore, the second lighting acceleration controller can provide a supply current or power greater than the current or power supplied by the first lighting acceleration controller in a certain period at the initial stage of the lighting of the discharge lamp. Further, the length of this period can be changed in accordance with the light-OFF time of the discharge lamp. It is therefore possible to improve the rising characteristic of the flux of light from the discharge lamp to shorten the reactivation time by effecting the light control that matches :with the state of the discharge lamp at the hot start thereof.

The present examples and embodiment are to be considered as illustrative and not restrictive and the invention is not to be limited to the details given herein, but may be modified within the scope: of the appended claims.

What is claimed is:

1. A lighting circuit for discharge lamp comprising:
    DC power supply circuit section for boosting and/or decreasing a DC voltage;
    a DC-AC converter for converting an output voltage of said DC power supply circuit section into an AC voltage;
    a lamp voltage detector for detecting a voltage applied to a discharge lamp or a signal equivalent to said voltage;
    a lamp current detector for detecting a current-flowing in said discharge lamp or a signal equivalent to said current; a control circuit for controlling said output voltage of said DC power supply circuit section in accordance with signals from said lamp voltage detector and said lamp current detector and performing lighting control in accordance with a predetermined control curve defining a characteristic of said lamp voltage v.s. said lamp current;
    a first lighting acceleration controller, provided in said control circuit, for, when said lamp voltage is smaller than a rated value or a minimum value in a range including said rated value, supplying power equal to or greater than rated power to said discharge lamp during transition from a point where said lamp voltage of said discharge lamp has indicated a minimum value to a point where said lamp voltage rises to a level of steady power control; and
    a second lighting acceleration controller, provided in said control circuit, for detecting a light-OFF time of said discharge lamp and executing such control as to increase an amount of a lamp current or power to be supplied to said discharge lamp as said light-OFF time becomes longer, whereby at beginning of lighting when said discharge lamp is reactivated immediately after deactivation, a length of a period in which said current or power supplied to said discharge lamp by said second lighting acceleration controller is greater than a current or power supplied to said discharge lamp by said first lighting acceleration controller is changed in accordance with said light-OFF time of said discharge lamp.

2. The lighting circuit according to claim 1, wherein said control circuit further includes:
    a current/voltage detector for detecting signals equivalent to said lamp current and lamp voltage;
    a steady power controller for performing control in a steady power area based on current and voltage detection signals from said current/voltage detector; and
    a pulse width modulation controller for effecting pulse width modulation control.

3. The lighting circuit according to claim 2, wherein said current/voltage detector receives an output voltage of said DC booster circuit and a current detection signal corresponding to an output current of said DC booster circuit and converted in a voltage form by a current detecting resistor provided between said DC booster circuit and said DC-AC converter.

4. The lighting circuit according to claim 2, wherein said current/voltage detector directly detects said lamp current and said lamp voltage.

5. The lighting circuit according to claim 2, wherein said voltage detection signal from said current/voltage detector is input to said first lighting acceleration controller.

6. The lighting circuit according to claim 2, wherein outputs of said first lighting acceleration controller, said second lighting acceleration controller and said steady power controller are added together before being sent to said pulse width modulation controller, and a control signal produced by said pulse width modulation controller is fed back to said DC booster circuit.

7. The lighting circuit according to claim 2, wherein said current/voltage detector comprises a first operation amplifier to which said output voltage of said DC booster circuit, after divided by voltage-dividing resistors, is supplied, and a second operation amplifier to which a terminal voltage of a current detecting resistor is supplied;

said first lighting acceleration controller has a third operation amplifier having an inverting input terminal connected via a first resistor to an output terminal of said first operation amplifier and a non-inverting input terminal supplied with a reference voltage, and first and second buffers, said first buffer having an input terminal connected to an output terminal of said third operation amplifier and an output terminal connected via a second resistor to said second buffer;

said steady power controller is structured as a differential inverting amplifier using one operation amplifier; and said second lighting acceleration controller comprises a light-OFF time detector for measuring time from a point when said discharge lamp is deactivated or a point when said lighting circuit is deactivated by switching off a lighting switch, and a third buffer.

8. The lighting circuit according to claim 7, wherein said buffer of said second lighting acceleration controller comprises an operation amplifier having a non-inverting input terminal supplied with an output of said light-OFF time detector, and a diode provided at an output stage of said operation amplifier and having an anode connected to an output terminal of said operation amplifier and a cathode connected to an inverting input terminal thereof and to said second buffer of said first lighting acceleration controller via a resistor.

9. The lighting circuit according to claim 7, wherein said light-OFF time detector includes:

a first constant voltage supply;

a capacitor connected to said constant voltage supply via a resistor and a first diode;

a fourth operation amplifier having an inverting input terminal supplied with a terminal voltage of said capacitor via a resistor;

a second constant voltage supply for supplying a reference voltage to a non-inverting input terminal of said fourth operation amplifier; and a second diode provided at an output stage of said fourth operation amplifier.

10. The lighting circuit according to claim 7, wherein said light-OFF time detector includes: a capacitor;

a resistor connected in parallel to said capacitor;

a fourth operation amplifier having an inverting input terminal supplied with a terminal voltage of said capacitor via another resistor; and a constant voltage supply for supplying a reference voltage to a non-inverting input terminal of said fourth operation amplifier.

11. The lighting circuit according to claim 7, wherein said light-OFF time detector includes:

a battery;

a constant voltage supply for producing a reset signal;

a clock generator for generating a clock signal;

a counter having a clock input terminal supplied with said clock signal from said clock generator and a reset terminal supplied with said reset signal from said constant voltage supply.

12. The lighting circuit according to claim 7, wherein said light-OFF time detector includes: a battery for supplying a supply voltage;

a constant voltage supply for providing a reference voltage;

an emitter-grounded NPN transistor having a base supplied with said reference voltage divided by voltage-dividing resistors and a collector connected to a power supply terminal via a resistor and to one end of a capacitor via another resistor, said supply voltage from said battery being supplied to said power supply terminal.

* * * * *